United States Patent
Onda

[19]

[11] Patent Number: 6,101,335
[45] Date of Patent: Aug. 8, 2000

[54] ZOOM LENS BARREL ASSEMBLY FOR A CAMERA

[75] Inventor: Kazuhiko Onda, Saitama, Japan

[73] Assignee: Fuji Photo Optical Co., Ltd., Saitama, Japan

[21] Appl. No.: 09/250,162

[22] Filed: Feb. 16, 1999

[30] Foreign Application Priority Data

Feb. 13, 1998 [JP] Japan ................................. 10-031416

[51] Int. Cl.[7] ................................................ G02B 7/10
[52] U.S. Cl. ............................ 396/79; 396/83; 359/698; 359/702
[58] Field of Search ................................. 359/696, 698, 359/702, 703; 396/79, 82, 83, 72

[56] References Cited

U.S. PATENT DOCUMENTS 4,397,528   8/1983   Kamata ..................................... 359/698
5,699,199  12/1997   Cho et al. ................................ 359/698

FOREIGN PATENT DOCUMENTS 6-100707  12/1994   Japan .
9-43487    2/1997   Japan .

*Primary Examiner*—Russell Adams
*Attorney, Agent, or Firm*—Young & Thompson

[57] ABSTRACT

A zoom lens barrel assembly includes an operating barrel formed with a zooming cam operative to perform zooming and focusing while turning, an inner movable barrel fixedly holding a front lens group and formed with a focusing cam which is movable axially only, an intermediate barrel capable of turning relatively to the inner movable barrel within a specified extent of angular interval, and a clutch mechanism operative to couple the intermediate barrel, during zooming, to the inner movable barrel together to restrain the intermediate barrel from turning relatively to the inner movable barrel so as thereby to shift axially the inner movable barrel through the zooming cam following a turn of the operating barrel and, during focusing, to the operating barrel together to restrain the intermediate barrel from turning relatively to the operating barrel and allow the inner movable barrel to turn relatively to the intermediate barrel so as thereby to shift axially the inner movable barrel relatively to the intermediate barrel through the focusing cam following a turn of the operating barrel. The clutch mechanism comprises a clutch lever which is moved to and held in a first position in which the clutch lever restrains a relative turn between the intermediate barrel and inner movable barrel during zooming and moved to a second position in which the clutch lever causes a restraint arm to restrain a relative turn between the operating barrel and intermediate barrel.

5 Claims, 6 Drawing Sheets

ZOOM LENS BARREL ASSEMBLY FOR A CAMERA

BACKGROUND OF THE INVENTION

1. Field of the Invention

This invention relates to a zoom lens barrel assembly for a camera, and, more particularly, to a power driven zoom lens barrel assembly for a camera which is operated by a single power drive device to achieve both adjusting a zoom ratio of the zoom lens and focusing the zoom lens.

2. Description of Related Art

In most zoom lenses, lens groups of the zoom lens are moved along optical axis by means of a cam mechanism differently between focusing the zoom lens on a subject and adjusting a zoom ratio of the zoom lens. To enable the zoom lens to achieve focusing and zooming in different manners, there have been proposed several techniques. Specifically, one of the techniques employs separate power drive devices such as electric motors for focusing and zoom ratio adjusting, respectively. Another technique employs a single power drive device. In the case where a single power drive device is used for both focusing and zoom ratio adjusting, there have been known several ways. One of them divides driving power from the single power drive device into two parts for focusing and zoom ratio adjusting. The second is, which is known from, for example, Japanese Patent Publication No. 6-100707, to incorporate a mechanism common to focusing and zoom ratio adjusting and to achieve focusing and zoom ratio adjusting alternately. Another one, which is known from, for example, Japanese Unexamined Patent Publication No. 9-43487, incorporates a restraint mechanism which causes relative axial movement along the optical axis between two lens groups of the zoom lens to achieve zoom ratio adjusting and locking axial movement of one of the two lens groups relative to the other during focusing.

The utilization of two power drive devices always yields an increase in camera price. The single power drive device cooperating with separate drive mechanisms for focusing and zoom ratio adjusting always needs an increased number of parts with an adverse effect of not only increasing costs but also increasing an overall size of the camera. The combination of a single power drive device and a common drive mechanism has a necessity for providing alternate lens guide cam slots for focusing and zoom ratio adjusting which makes a lens drive mechanism quite complex. While the last zoom lens drive system can remove the above drawbacks, however, the locking mechanism needs an electromagnetic solenoid to disconnect operative linkage between one of the two lens groups and its associated cam to lock the axial movement of the lens group and to hold the lens group with friction only so as to remain immovable, which possibly leads to unstable focusing operation.

SUMMARY OF THE INVENTION

It is therefore an object of the invention to provide a zoom lens barrel assembly which is small in overall size and provided at low costs.

The foregoing object is accomplished by providing a zoom lens barrel assembly for a zoom lens of the type which is operated in opposite directions for focusing and zooming. The zoom lens barrel assembly is characterized in that the zoom lens barrel comprises an operating barrel formed with a zooming cam and a focusing cam for guiding at least two of the lens elements, the operating barrel being able to turn about the optical axis to shift the at least two lens element along the optical axis through the zooming cam and focusing cam for zooming and focusing the zoom lens, an inner movable barrel fixedly holding at least another one of the lens elements and formed with a focusing cam, the inner movable barrel being coaxially installed in the operating barrel so as to be movable in an axial direction only along the optical axis to shift the another lens element along the optical axis for focusing, an intermediate barrel coaxially installed in the operating barrel so as to be able to turn relatively to the operating barrel and the inner movable barrel about an optical axis of the zoom lens within a specified extent of angular interval, and clutch means for coupling the intermediate barrel to the inner movable barrel together to restrain the intermediate barrel from turning relatively to the inner movable barrel so as thereby to shift the inner movable barrel together with the intermediate barrel along the optical axis through the zooming cam following a turn of the operating barrel during zooming, and uncoupling the intermediate barrel from the inner movable barrel and coupling the intermediate barrel to the operating barrel to restrain the intermediate barrel from turning relatively to the operating barrel and allow the inner movable barrel to turn relative to the intermediate barrel, so as thereby to shift the inner movable barrel relatively to the intermediate barrel and the operating barrel along the optical axis through the focusing cam of the inner movable barrel following a turn of the operating barrel during focusing.

According to a preferred embodiment of the invention, the clutch means comprises a clutch lever movable between a first position for coupling the intermediate barrel to the inner movable barrel together and a second position, an actuator operative to move the clutch lever between the first and second position, and a restraint arm operationally linked to the clutch lever and operative to permit a relative turn between the operating barrel and the intermediate barrel while the clutch lever is in the first position and to restrain the intermediate barrel from turning relatively to the operating barrel while the clutch lever is in the second position. In this instance, the actuator may comprises a general metal spring operative to urge and hold the clutch lever in the first position and a shape memory alloy spring operative to force the clutch lever to the second position against the torsion spring while energized during focusing and allowing the clutch lever to be forced to the first position by the general metal spring.

With the zoom lens barrel assembly which achieves zooming of the zoom lens with the intermediate barrel restrained from turning relatively to the inner movable barrel movable in the axial direction only by the clutch means during zooming, and achieves focusing of the zoom lens through a turn of the intermediate barrel restrained from turning relatively to the operating barrel by the clutch means, the mechanical structure of the zoom lens barrel assembly of the type having a single operating barrel operative to perform focusing and zooming is significantly simplified. Further, the zoom lens barrel assembly incorporates the actuator operated clutch means by which the operating barrel and intermediate barrel are coupled during focusing, providing reliable focusing.

BRIEF DESCRIPTION OF THE DRAWINGS

The above and other objects and features of the present invention will become clear from the following description of a specific embodiment thereof when considering in conjunction with the accompanying drawings wherein like numbers have been employed in the different figures to denote the structurally and operationally same parts and mechanisms, and in which.

DETAILED DESCRIPTION OF THE SPECIFIC EMBODIMENT

Because zoom lens barrel assemblies are well known, the present description will be directed in particular to elements and mechanisms forming part of, or cooperating directly with, a zoom lens barrel assembly in accordance with the present invention. It is to be understood that elements not specifically shown or described can take various forms well known to those skilled in the art.

The term "wide-angle direction" as used herein shall mean and refer to a clockwise direction as seen from the camera side in which the focal length of the zoom lens is shortened, and the term "telephoto direction" as used herein shall mean and refer to a counterclockwise direction as seen from the camera side in which the focal length of the zoom lens is increased.

Figure 1:
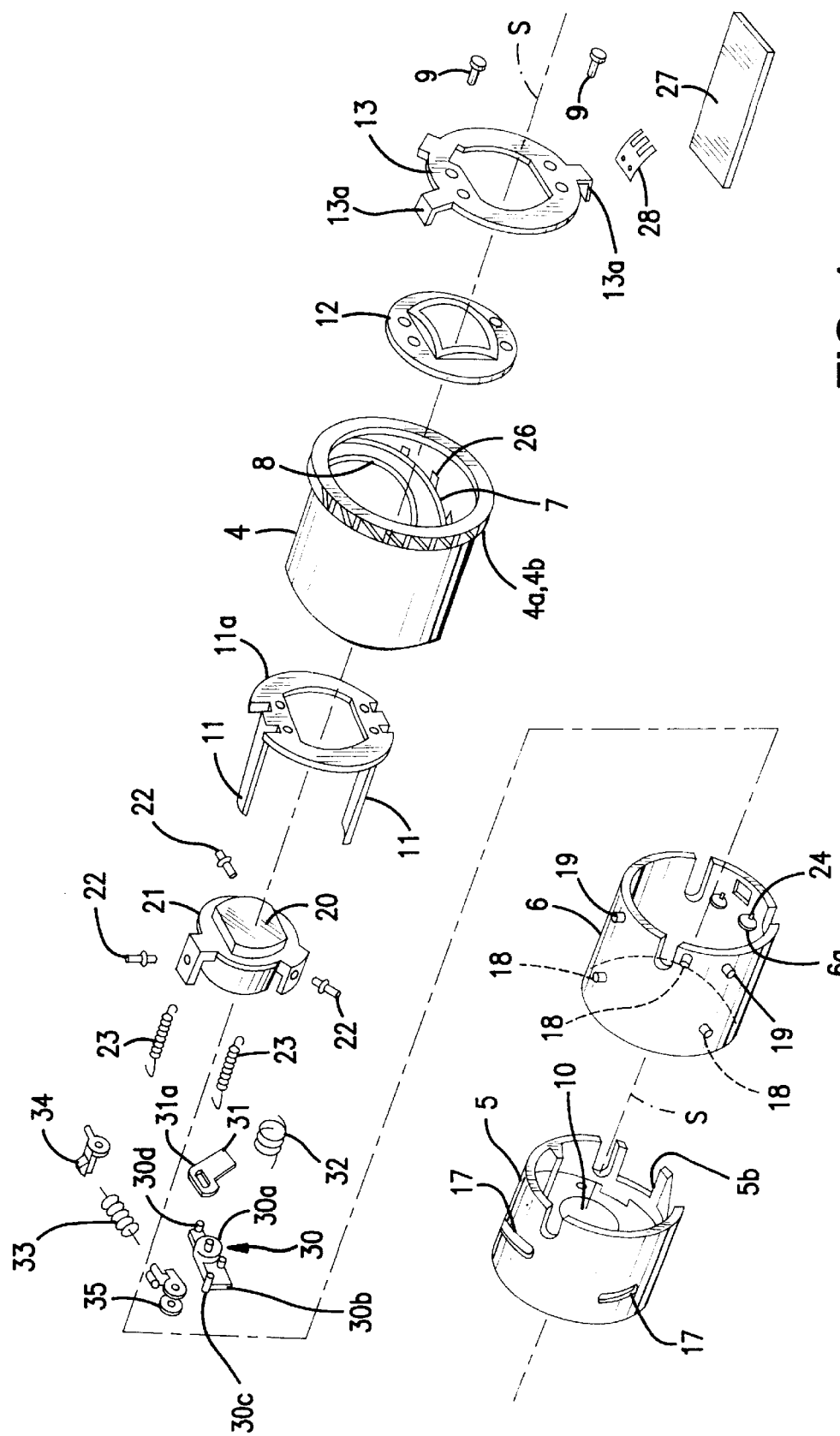
FIG. 1 is an exploded perspective view of an essential part of a zoom lens barrel assembly in accordance with an embodiment of the invention.
Figure 2:
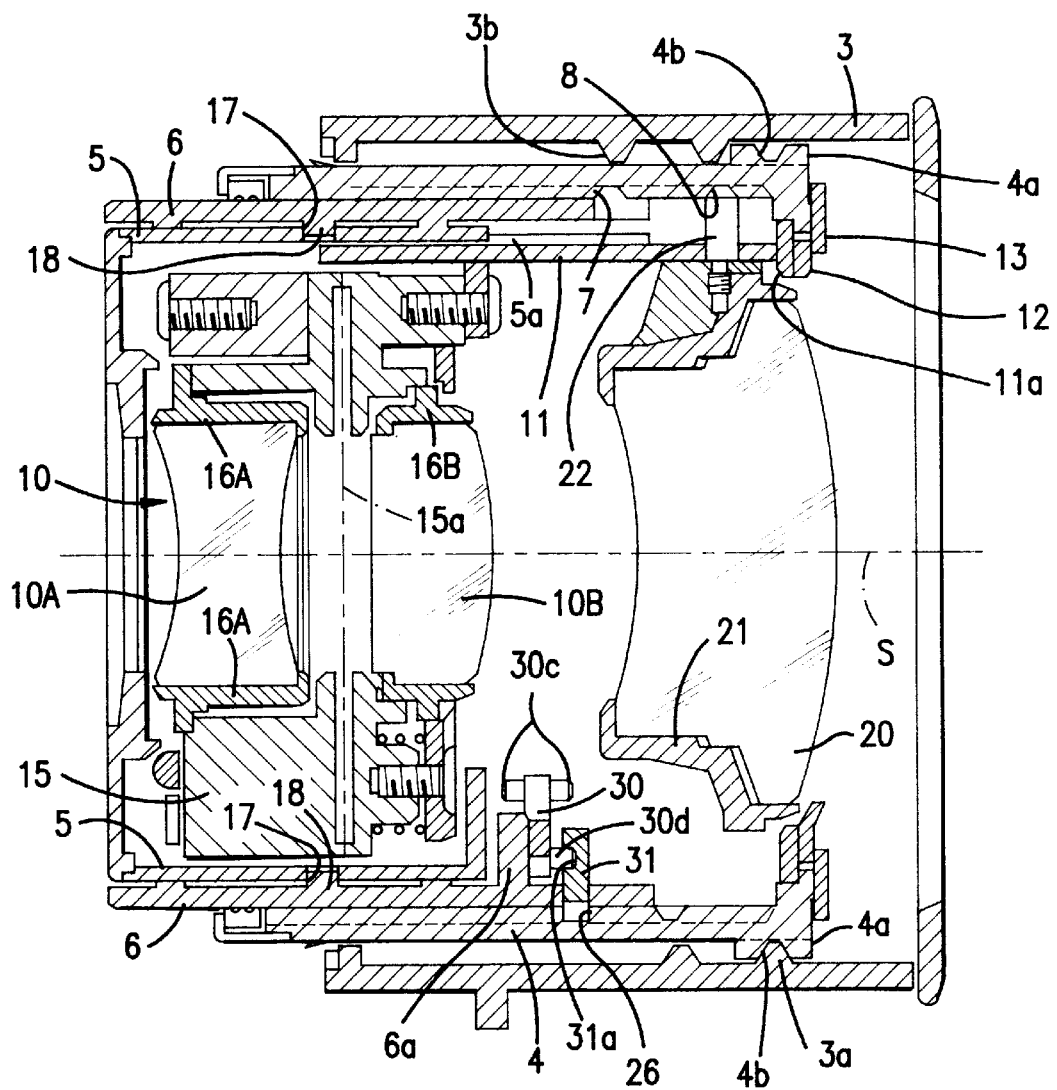
FIG. 2 is a longitudinal sectional view of the zoom lens barrel assembly shown in FIG. 1 which is placed in a wide-angle position.
Figure 3:
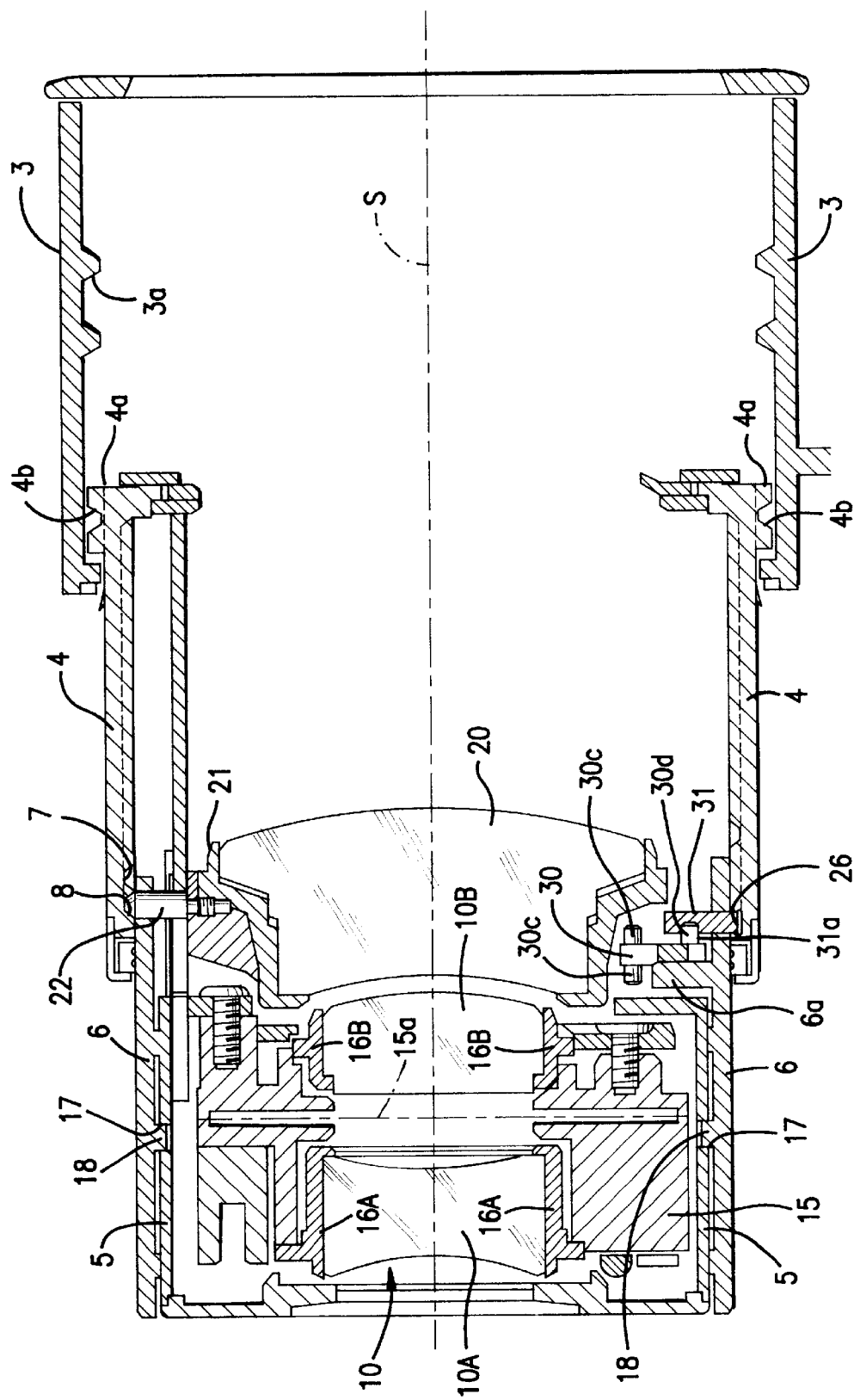
FIG. 3 is a longitudinal sectional view of the zoom lens barrel assembly shown in FIG. 1 which is placed in a telephoto position.

Referring to the drawings in detail, in particular, to FIGS. 1 through 3, a zoom lens barrel assembly 1 in accordance with an embodiment of the invention incorporates a zoom lens consisting of, for example, first to third lens groups 10A, 10B and 20 held by lens holders 16A, 16B and 21, respectively. The zoom lens barrel assembly 1 comprises a plurality of cylindrical barrels coaxially arranged along an optical axis S of a zoom lens, namely an outer stationary barrel 3 which is fixed to a camera body (not shown), an operating barrel 4 disposed in the stationary barrel 3 and driven by an electric reversible motor (not shown) disposed in the camera body, an inner movable barrel 5 disposed in the operating barrel 4 to move axially back and force along the optical axis S, and an intermediate barrel 6 disposed between the operating barrel 4 and the inner movable barrel 5 and movable axially back and force along the optical axis S together with the inner movable barrel 5 following turns of the operating barrel 4 in opposite directions. The intermediate barrel 6 is able to turn with respect to the inner movable barrel 5 within a specified extent of angular interval as will be described later. The operating barrel 4 at its rear end is formed with external gear teeth 4a on the outer wall thereof which are in mesh with elongated teeth of a rod gear (not shown) installed to the outer wall of the stationary barrel 3 and external female helical threads 4b on the outer wall thereof which are in mesh with male helical threads 3a formed on the inner wall of the stationary barrel 3. When the operating barrel 4 is turned in opposite directions by the reversible motor through the rod gear, it is forced to slide on the rod gear and thrust back and forth along the optical axis S of the zoom lens.

Figure 4:
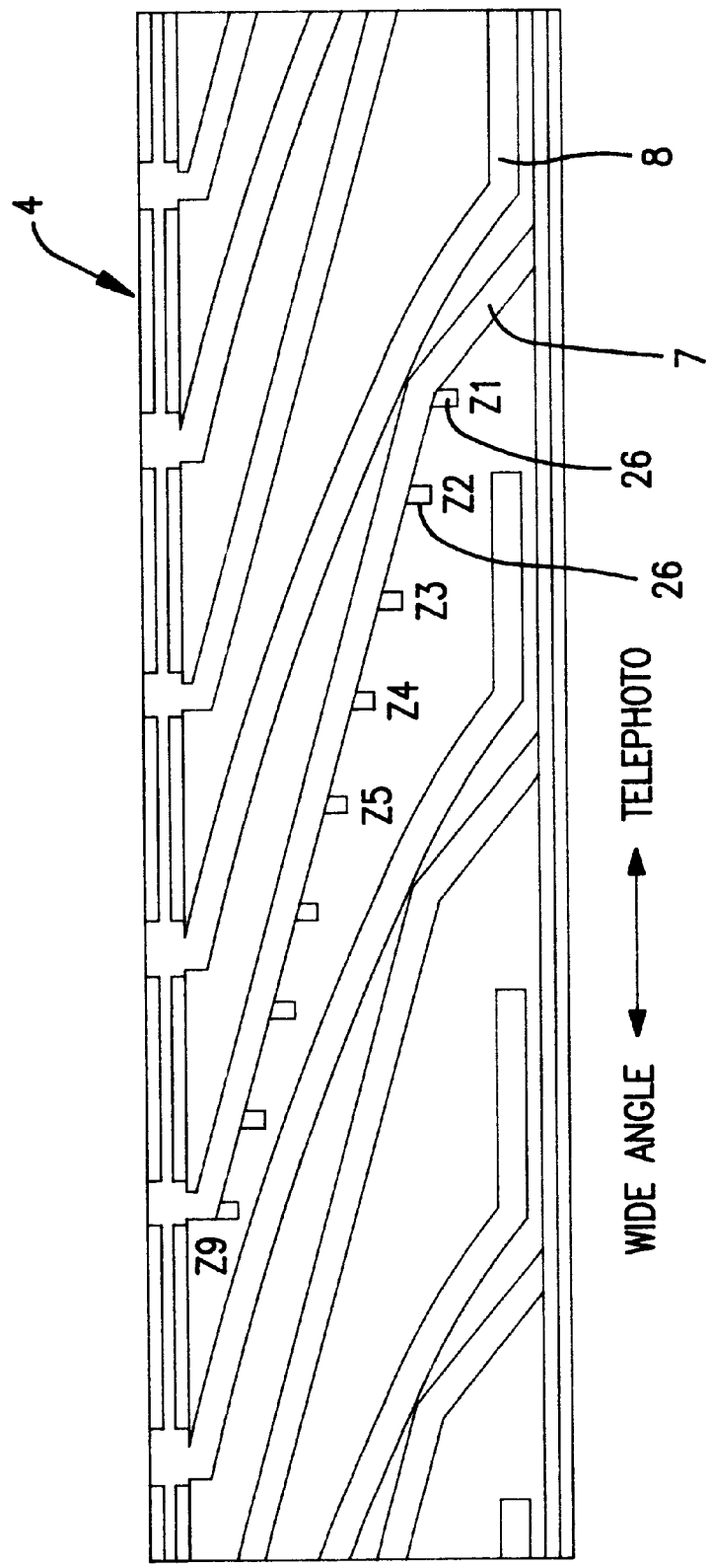
FIG. 4 is a developed view of an operating barrel.

As shown in FIG. 4, the operating barrel 4 has a plurality of cam grooves which comprise, for example, three pairs of cam grooves 7 and 8, formed on an inner wall thereof. The cam groove 7 which is referred to as a zooming cam groove guides the inner movable barrel 5 supporting the front lens group 10 to move it along the zoom lens axis S during zooming the zoom lens. The cam groove 8 which is referred to as a zooming/focusing cam groove guide the lens holder 21 holding the rear lens group 20 to move it along the zoom lens axis S both during zooming and the zoom lens and during focusing the zoom lens. A turn in the wide angle direction (clockwise direction) of the operating barrel 4 is followed by a forward axial movement of the inner movable barrel 5, and a turn in the telephoto direction (counterclockwise direction) of the operating barrel 4 is followed by a reverse axial movement of the inner movable barrel 5 and the intermediate barrel 6 together.

An inner key ring 11a with integral keys 11 arranged in diametrically opposite positions and axially extending forward therefrom, an intermediate shield ring 12 and an outer key ring 13 with integral detents 13a arranged in diametrically opposite positions and axially extending forward therefrom are coupled together as a key ring assembly by means of set screws 9. The key ring assembly is installed to the rear end of the operating barrel 4 such that the inner key ring 11a and the outer key ring 13 put a rear flange 4e of the operating barrel 4 therebetween and the intermediate shield ring 12 meets the flange 4e in the radial direction. The key ring assembly and the operating barrel 4 are rotatable relatively to each other. The key assembly is coupled to the stationary barrel 3 by the detents 13a axially extending forward from the outer key ring 13 and received in axial grooves (not shown) formed in the inner wall of the stationary barrel 3 so as to slide in the axial grooves. By means of the engagement between the detents 13a and the grooves, the ring assembly is rotatable relatively to the operating barrel 4 but movable integrally with the operating barrel 4 in the axial direction.

As shown in FIGS. 2 and 3, the inner movable barrel 5 at its rear end has axially extending straight key grooves 6a formed on the inner wall thereof and arranged in diametrically opposite positions. The inner movable barrel 5 is coupled indirectly to the operating barrel 4 by means of the keys 11 of the inner key ring 11a received in the key grooves 6a, so as thereby to move along the optical axis S. The inner movable barrel 5 fixedly mounts the front lens group 10 and a shutter unit 15 (only schematically shown) therein. The front lens group 10 includes a front lens 10A supported by a lens holder 16A and a rear lens 10B supported by a lens holder 16B arranged in order from the subject side. A shutter blade 15a, which is actuated by the shutter unit 15, is disposed between the front and rear lens holders 16A and 16B.

The inner movable barrel 5 has three focusing cam slots 17 formed on the outer wall thereof and arranged at regular angular intervals, and the intermediate barrel 6 has three cam follower pins 18 radially extending from the inner wall thereof and arranged at regular angular intervals. The cam follower pins 18 of the intermediate barrel 6 are received in the focusing cam slots 17 of the inner movable barrel 5, respectively. Although the specified extent of angular interval within which the intermediate barrel 6 is able to turn with respect to the inner movable barrel 5 is defined by the circumpherential length of each focusing cam slot 17, it may be defined by stoppers provided on the inner movable barrel 5 correspondingly in position to the focusing cam slots 17 and engageable with the extreme end of the focusing cam slot 17. In this instance, the focusing cam slot 17 must be extended by the thickness in the circumpherential direction of the stopper. The intermediate barrel 6 further has three cam follower pins 19 radially extending from the outer wall thereof and arranged at regular angular intervals. The cam follower pins 19 are received in the respective zooming cam groove 7 of the operating barrel 4.

The second lens group 20 is supported by a lens holder 21 having three cam follower pins 22 extending radially from the outer wall thereof and arranged at regular angular separations. The lens holder 21 is installed in the inner movable barrel 5 such that it is movable relatively to the inner movable barrel 5 in the axial direction only. The three cam follower pins 22 of the lens holder 30 are received in the respective zooming/focusing cam grooves 8 of the operating barrel 4. By means of the engagement between these zooming/focusing cam grooves 8 and cam follower pins 22, a turn of the operating barrel 4 forces the intermediate barrel 6 along the zoom lens axis S together with the lens holder 21 of the rear lens group 20.

Two tension springs 23 couples the lens holder 21 to the inner movable barrel 5 together to bring the cam follower pins 22 of the lens holder 21 into coercive engagement with the rear side edges of the zooming/focusing cam grooves 8 and the front side edges of the focusing cam grooves 17 of the inner movable barrel 5 into coercive engagement with the cam follower pins 18 of the inner movable barrel 5. As clearly shown in FIG. 4, the operating barrel 4 has a plurality of detent recesses 26 arranged along one of the zooming cam grooves 7 at regular angular intervals. The detent recesses 26 correspond to zooming positions of the operating barrel 4, i.e. the predetermined zoom ratios of the zoom lens, z1 (wide-angle end), z2 . . . , z9 (telephoto end).

The zoom lens barrel assembly 1 is provided with an encoder operative to detect axial positions of the operating barrel 4 so as thereby to stop the reversible motor, situating the zoom lens in a desired zooming position. As shown in FIG. 1, the encoder includes an encoder base plate 27 secured to the stationary barrel 3. The encoder base plate 27 is formed with an electrically conductive encoder pattern (not shown) and an encoder brush 28 secured to the outer key ring 13. The encoder pattern comprises segments arranged in the axial direction at regular intervals equivalent to the angular intervals of the detent recesses 26. When the operating barrel 4 moves back and forth, the encoder brush 28 slides on the encoder base plate 27 keeping in contact with the encoder pattern. When the encoder detects an axial position of the operating barrel 4 corresponding to an intended zoom ratio, the encoder provides a signal for stopping the reversible motor.

Figure 5:
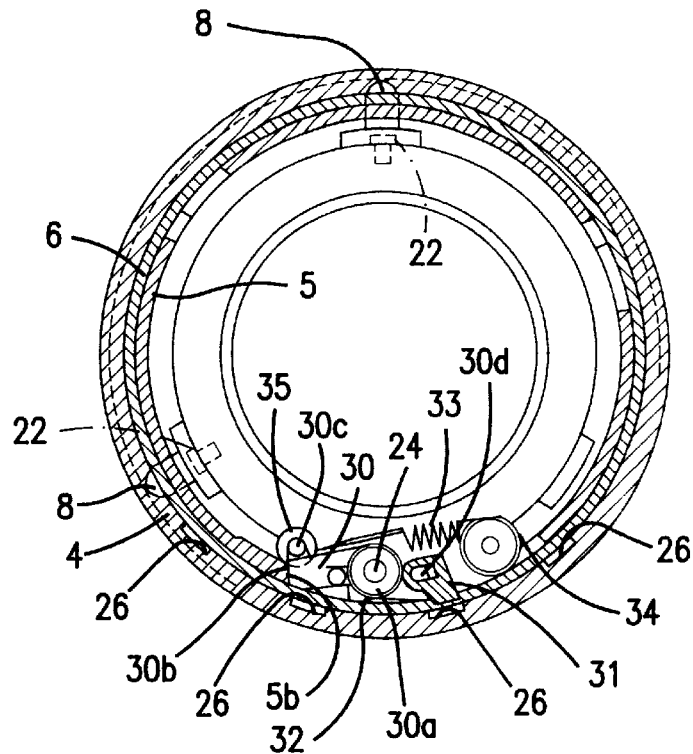
FIG. 5 is a cross-sectional view of the zoom lens barrel assembly placed in one of predetermined zooming positions.
Figure 6:
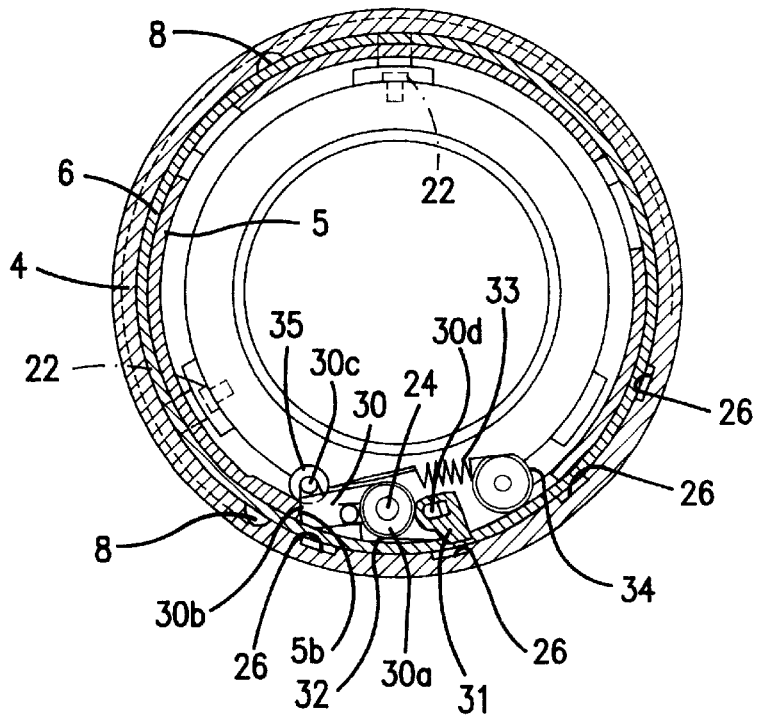
FIGS. 6 is a cross-sectional view of the zoom lens barrel assembly placed in another one of predetermined zooming positions.

As shown in FIGS. 5 through 8, the zoom lens barrel assembly 1 is provided with a double-arm clutch lever 30 operative to restrain the intermediate barrel 6 from turning relatively to the inner movable barrel 5 during zooming and from turning relatively to the operating barrel 4 during focusing. Specifically, the intermediate barrel 6 has an axial pin 24 (see FIG. 1) extending rearward supported by an integral bracket 6a projecting from the inner wall. The axial pin 24 pivotally mounts the clutch lever 30 at its center boss 30a. One arm of the clutch lever 30 has an end having a detent gate 30b engageable with detent step 5b formed integrally on the inner wall of the inner movable barrel 5 and a pin 30c opposite to the detent gate 30b. The pin 30c is provided with a fixed terminal 35. An actuator coli spring 33 made of a shape memory alloy is mounted as a clutch actuator between the fixed terminal 35 attached to the arm of the clutch lever 30 and a fixed terminal 34 attached to the inner wall of the intermediate barrel 6. An electric current is applied to the actuator coil spring 33 through the fixed terminals 34 and 35 during focusing. Another arm of the clutch lever 30 has an actuator pin 30d with a restraint arm 31 having a mounting bore 31a. The restraint arm 31 is linked to the clutch lever 30 so as to move in a radial direction of the intermediate barrel 6. As shown in FIG. 5 and 6, the restraint arm 31 is designed and adapted to place its tip end in a position to face one of the detent recesses 26 when the operating barrel 4 is situated in one of the predetermined zoom positions. The clutch lever 30 is urged in a clockwise direction by a torsion spring 32 made of a general metal mounted between the center boss 30a and the pin 24 so as to bring the detent gate 30b of the arm into engagement with the detent step 5b of the inner movable barrel 5.

The actuator coil spring 33 urges the clutch lever 30 in a clockwise direction (as seen in FIGS. 5–8) against the torsion spring 32. Unless the zoom lens barrel assembly 1 is operated to focus the zoom lens, i.e. before the zoom lens barrel assembly 1 is operated to focus the zoom lens, the actuator coil spring 33 is not applied with any electric current to maintain its original shape, leaving the clutch lever being urged in a counterclockwise direction by the torsion spring 32. As clearly seen in FIGS. 5 and 6 showing the zoom lens assembly situated in one of the predetermined zooming position, the clutch lever 30 is engaged position (first position) in which it holds its tip end in contact with the inner wall of the intermediate barrel 6. Accordingly, when the inner movable barrel 5 turns in the wide angle direction (clockwise direction), the clutch lever 30 at its detent gate 30b is brought into engagement with the detent step 5b of the inner movable barrel 5, so as thereby to operationally couple the inner movable barrel 5 and the intermediate barrel 6 together while the inner movable barrel 5 turns in the wide angle direction. In the zooming position shown in FIGS. 5 and 6, the restraint arm 31 remains disengaged from one of the detent recesses 26 of the operating barrel 4, allowing the operating barrel 4 to turn relatively to the intermediate barrel 6. In this state, when the operating barrel 4 is turned, the inner movable barrel 5, and hence the lens holder 21 are forced back or forth along the optical axis S, achieving zooming the zooming lens.

Figure 7:
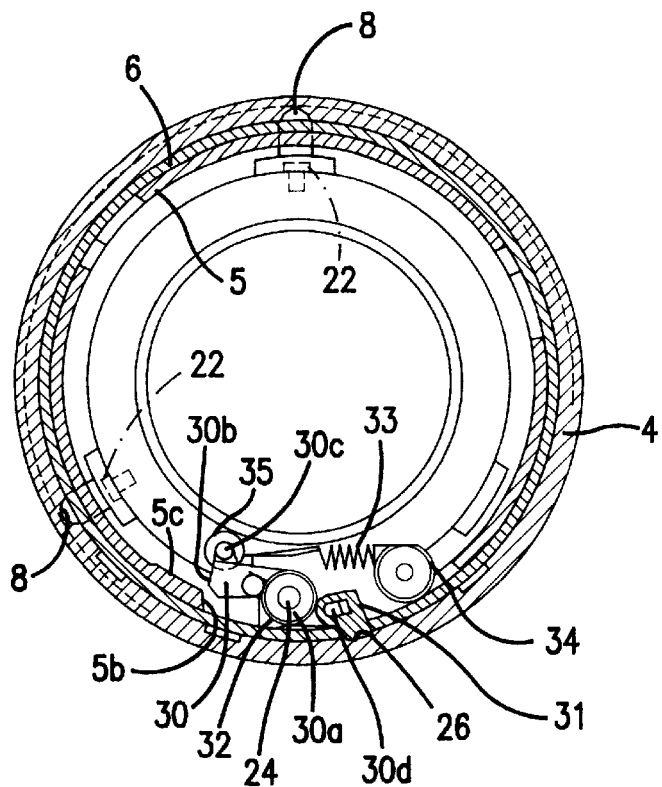
FIG. 7 is a cross-sectional view of the zoom lens barrel assembly with a shape memory alloy spring of a clutch mechanism applied with an electric current.

When turning the operating barrel 4 to focus the zoom lens, the actuator coil spring 33 is applied with an electric current through the terminals 34 and 35 with an effect of generating heat, contracting to force the clutch lever 30 to turn in the clockwise direction against the torsion spring 32. In consequence, as shown in FIG. 7, while the clutch lever 30 at its detent gate 30b is disengaged from the detent step 5b of the inner movable barrel 5, the restraint arm 31 is brought into engagement with one of the detent recesses 26 of the operating barrel 4, operationally coupling the operating barrel 4 and the intermediate barrel 6 together so as thereby to prevent the intermediate barrel 6 from turning relatively to the operating barrel 4. Accordingly, the intermediate barrel 6 is allowed to turn relatively to the inner movable barrel 5. When the operating barrel 4 is turned in this state, the intermediate barrel 6 turns relatively to the inner movable barrel 5 following a turn of the operating barrel 4, forcing the inner movable barrel 5 with the front lens group 10 rearward along the optical axis S through the engagement between the cam follower pins 18 of the intermediate barrel 6 and the focusing cam grooves 17 of the inner movable barrel 5 to focus the zoom lens on a subject between a closest subject distance and an infinite subject distance position, so as thereby to achieve focusing.

Figure 8:
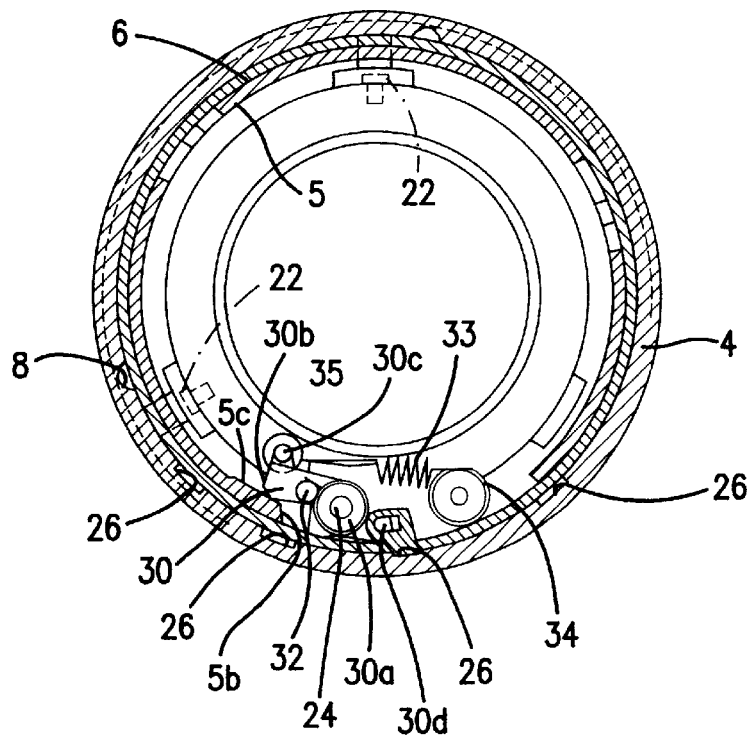
FIG. 8 is a cross-sectional view of the zoom lens barrel assembly placed in a focused position.

When turning the operating barrel 4 in the clockwise direction from the state shown in FIG. 7 in which the clutch lever 30 at its detent gate 30b remains disengaged from the detent step 5b of the inner movable barrel 5 for focusing, the clutch lever 30 at its tip end is forced to run on to a wall 5c as shown in FIG. 8. In this state, the restraint arm 31 stays in an engaged position (second position) in which it remains engaged with one of the detent recesses 26 of the operating barrel 4, leaving the actuator coil spring 33 being shut off from an electric current if the electric current is removed from the actuator coil spring 33. An electric current is supplied to the actuator coil spring 33 only during focusing, making it possible to keep a battery under the minimum power consumption.

As described above, the zoom lens barrel assembly 1 of the invention achieves zooming of the zoom lens with the intermediate barrel 6 restrained from turning relatively to the inner movable barrel 5 movable in the axial direction only by the clutch lever 30 during zooming, and achieves focusing of the zoom lens through a turn of the intermediate barrel 6 restrained from turning relatively to the operating barrel 4 by the restraint arm 31. This makes the zoom lens barrel assembly of the type having a single operating barrel operative to perform focusing and zooming significantly simple in mechanical structure. Further, the clutch lever 30 and restraint arm 31 by which the operating barrel and intermediate barrel are coupled during focusing are operated by the actuator coil spring 33, which provides reliable focusing and is advantageous to keeping a battery under the minimum power consumption.

It is to be understood that the present invention may be embodied with various changes, modifications and improvements, which may occur to those skilled in the art, without departing from the spirit and scope of the invention defined in the following claims.

What is claimed is:

1. A zoom lens barrel assembly for zooming and focusing a zoom lens comprising a plurality of lens elements, which comprises:

an operating barrel formed with a zooming cam and a focusing cam for guiding at least two of said lens elements, said operating barrel being able to turn about said optical axis to shift said at least two lens element along said optical axis through said zooming cam and focusing cam for zooming and focusing the zoom lens;

an inner movable barrel fixedly holding at least another one of said lens elements and formed with a focusing cam, said inner movable barrel being coaxially installed in said operating barrel so as to be movable in an axial direction only along said optical axis to shift said another lens element along said optical axis for focusing;

an intermediate barrel coaxially installed in said operating barrel so as to be able to turn relatively to said operating barrel and said inner movable barrel about an optical axis of the zoom lens within a specified extent of angular interval; and clutch means for coupling said intermediate barrel to said inner movable barrel together to restrain said intermediate barrel from turning relatively to said inner movable barrel so as thereby to shift said inner movable barrel together with said intermediate barrel along said optical axis through said zooming cam following a turn of said operating barrel during zooming, and uncoupling said intermediate barrel from said inner movable barrel and coupling said intermediate barrel to said operating barrel to restrain said intermediate barrel from turning relatively to said operating barrel and allow said inner movable barrel to turn relative to said intermediate barrel, so as thereby to shift said inner movable barrel relatively to said intermediate barrel and said operating barrel along said optical axis through said focusing cam of said inner movable barrel following a turn of said operating barrel during focusing.

2. The zoom lens barrel assembly as defined in claim 1, wherein said clutch means comprises a clutch lever movable between a first position for coupling said intermediate barrel to said inner movable barrel together and a second position, an actuator operative to move said clutch lever between said first and second position, and a restraint arm operationally linked to said clutch lever and operative to permit a relative turn between said operating barrel and said intermediate barrel while said clutch lever is in said first position and to restrain said intermediate barrel from turning relatively to said operating barrel while said clutch lever is in said second position.

3. The zoom lens barrel assembly as defined in claim 2, wherein said clutch means includes a plurality of detent recesses arranged at regular angular intervals on said operating barrel which are engaged by said restraint arm in any one of predetermined zooming positions to hold said operating barrel in said predetermined zooming position during focusing.

4. The zoom lens barrel assembly as defined in claim 3, wherein said actuator comprising a general metal spring operative to urge and hold said clutch lever in said first position and a shape memory alloy spring operative to force said clutch lever to said second position against said torsion spring while energized during focusing and allowing said clutch lever to be forced to said first position by said general metal spring.

5. The zoom lens barrel assembly as defined in claim 1, wherein said operating barrel is operated in opposite directions for focusing and zooming.

* * * * *